(12) United States Patent
Kurucz, Jr. et al.

(10) Patent No.: US 9,408,087 B2
(45) Date of Patent: Aug. 2, 2016

(54) SYSTEMS AND METHODS FOR DYNAMIC FREQUENCY SELECTION FOR INTERFERENCE AVOIDANCE

(71) Applicant: General Electric Company, Schenectady, NY (US)

(72) Inventors: Paul Kurucz, Jr., Rochester, NY (US); Jonathan M. Vilagy, Batavia, NY (US); Alexandros A. Charissis, Rochester, NY (US)

(73) Assignee: General Electric Company, Schenectady, NY (US)

( * ) Notice: Subject to any disclaimer, the term of this patent is extended or adjusted under 35 U.S.C. 154(b) by 221 days.

(21) Appl. No.: 13/760,953

(22) Filed: Feb. 6, 2013

(65) Prior Publication Data

US 2014/0220964 A1    Aug. 7, 2014

(51) Int. Cl.
*H04W 24/02* (2009.01)
*H04W 72/08* (2009.01)

(52) U.S. Cl.
CPC ............. *H04W 24/02* (2013.01); *H04W 72/08* (2013.01)

(58) Field of Classification Search
CPC .............................. H04W 24/02; H04W 72/08
USPC ............... 455/423, 425, 67.11, 67.13, 67.14, 455/67.7, 68, 69
See application file for complete search history.

(56) References Cited

U.S. PATENT DOCUMENTS

| | | | |
|---|---|---|---|
| 6,052,596 A | 4/2000 | Barnickel | |
| 6,697,013 B2 | 2/2004 | McFarland et al. | |
| 6,870,815 B2 | 3/2005 | McFarland et al. | |
| 7,107,032 B2 | 9/2006 | Li | |
| 7,155,230 B2 | 12/2006 | Tsien | |
| 2001/0046867 A1* | 11/2001 | Mizoguchi | H04B 7/005 455/452.2 |
| 2003/0107512 A1* | 6/2003 | McFarland et al. | 342/159 |
| 2006/0258296 A1 | 11/2006 | Steer et al. | |
| 2010/0277362 A1 | 11/2010 | Wen et al. | |

OTHER PUBLICATIONS

"Broadband Radio Access Networks (BRAN); 5,8 Ghz Fixed Broadband Data Transmitting Systems; Harmonized EN Covering the Essential Requirements of Article 3.2 of the R&TTE Directive", Harmonizing European Standard (Telecommunications Series), Jul. 1, 2008, pp. 14-16, V1.2.1, ETSI, Sophia Antipolis Cedex, France.
EP Search Report and Written Opinion issued Jun. 25, 2014 in connection with corresponding EP Patent Application No. 14153706.8.

* cited by examiner

*Primary Examiner* — Marcos Torres
(74) *Attorney, Agent, or Firm* — Armstrong Teasdale LLP

(57) ABSTRACT

Systems and methods for identifying interference that warrants dynamic frequency selection (DFS) are provided. In one example, a wireless data radio system includes a radio frequency receiver and thresholding circuitry. The radio frequency receiver may provide a received signal strength indicator. The thresholding circuitry may compare the received signal strength indicator to a threshold value associated with radio interference, determine whether a dynamic frequency selection operation is warranted based at least in part on the comparison, and output a dynamic frequency selection signal indicating whether the dynamic frequency selection operation is warranted.

9 Claims, 3 Drawing Sheets

US 9,408,087 B2

SYSTEMS AND METHODS FOR DYNAMIC FREQUENCY SELECTION FOR INTERFERENCE AVOIDANCE

BACKGROUND

This disclosure relates to dynamic frequency selection (DFS) in wireless data radio systems to avoid interference and/or comply with technical specifications.

Wireless data radio systems must comply with various technical specifications depending on the jurisdiction in which the radios operate. Some of these technical specifications may require a wireless data radio system operating in certain frequency bands to support dynamic frequency selection (DFS) to avoid specific types of interference. For example, the ETSI EN 302 502 specification requires wireless data radios operating in the 5725 to 5850 MHz frequency band to use DFS to avoid radar interference. Similarly, the FCC Part 90 specification (specifically, the FCC Part 90.1319 specification) requires interference avoidance in the upper 25 MHz of the frequency band from 3.650 to 3.700 GHz, which may be accomplished using DFS. Some Part 90 wireless data radios, however, may avoid such interference by simply failing to operate in these frequency bands. Alternatively, some Part 90 wireless data radios may carry out a simplified form of interference avoidance by temporarily ceasing transmissions when any type of interference is detected. Doing so, however, may leave a high likelihood that the interference will continue to be present on that channel. In addition, many conventional wireless data radio modems and/or processors may attempt to detect interference such as radar interference, but frequently may falsely detect interference. This may reduce the ability of the wireless data radio system to maintain communication for long periods of time, even when interference, such as radar, is not present.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a wireless data radio system includes a radio frequency receiver and thresholding circuitry. The radio frequency receiver may provide a received signal strength indicator. The thresholding circuitry may compare the received signal strength indicator to a threshold value associated with radio interference, determine whether a dynamic frequency selection operation is warranted based at least in part on the comparison, and output a dynamic frequency selection signal indicating whether the dynamic frequency selection operation is warranted.

In a second embodiment, one or more tangible non-transitory machine-readable media includes instructions to receive a radio frequency received signal strength indicator from a radio frequency receiver and a control signal from a communications processor, the latter being received during an interference-testing period of an ongoing communication frame during which neither a base station nor a subscriber station of a wireless data radio system is communicating. The instructions also include instructions to, upon receipt of the control signal, compare the radio frequency received signal strength indicator to a threshold value, determine whether a dynamic frequency selection operation is warranted based at least in part on the comparison, and output a digital signal indicating whether the dynamic frequency selection operation is warranted.

In a third embodiment, a wireless data radio system includes a base station that may communicate with at least one subscriber station over a communication frame. The communication frame may include a downlink period for communication from the base station to the at least one subscriber station, an uplink period for communication from the at least one subscriber station to the base station, and an interference test period during which neither the base station nor the at least one subscriber station is communicating. The base station may identify whether radio interference is occurring during the interference test period that indicates that dynamic frequency selection operation is warranted.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
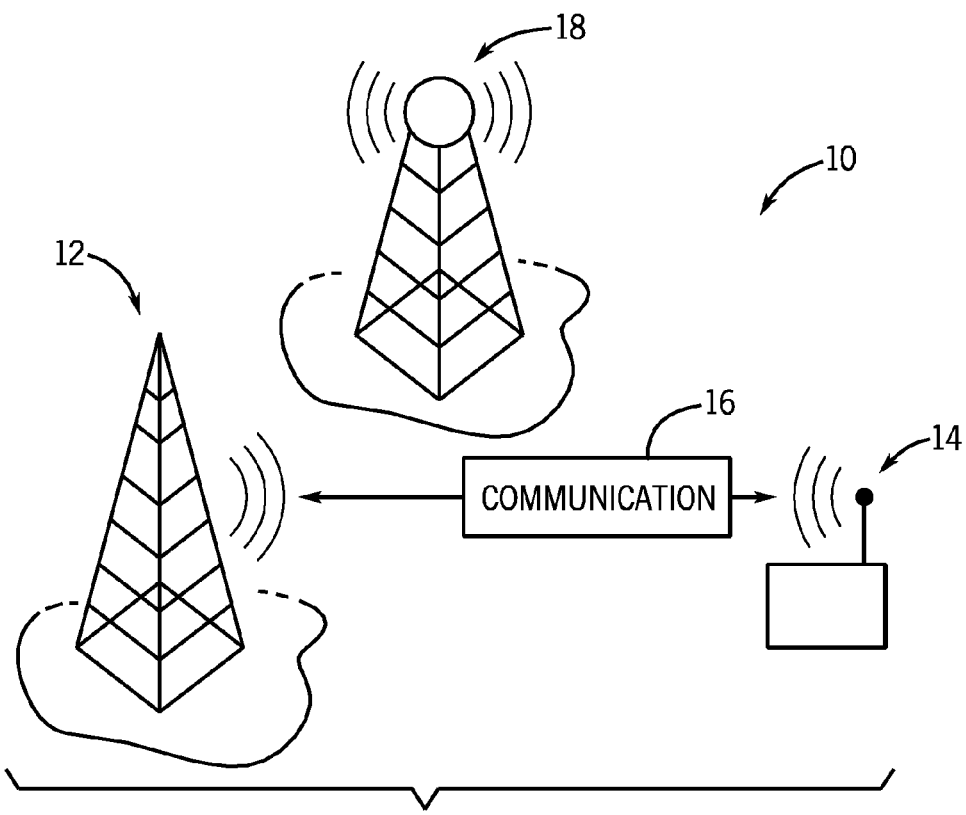
FIG. 1 is a simplified block diagram of a wireless data radio system that performs dynamic frequency selection (DFS) to avoid certain interference, in accordance with an embodiment.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Wireless data radios are used in a variety of contexts and frequency bands. Wireless data radios of this disclosure may perform dynamic frequency selection (DFS) when specific interference is detected. Because the wireless data radios of this disclosure are able to perform DFS operation upon detecting specific interference, the wireless data radios of this disclosure may operate in frequency bands governed where such operation is required or advantageous.

In particular, the wireless data radios of this disclosure may employ not merely a conventional communications processor, but also thresholding circuitry that can detect when interference exceeds a particular threshold. In certain examples, the threshold circuitry may not merely accumulate interference and use the accumulated interference to determine when to perform dynamic frequency selection. Indeed, in these examples, the wireless data radios may account for baseband DC offsets on the radio frequency (RF) inputs obtained from a radio frequency (RF) receiver/transmitter more so than other wireless data radios and, further, more than may be commercially available in a conventional communications processor. The wireless data radios of this disclosure also may communicate using communication frames that include not only downlink and uplink periods, but also a separate period to test for interference. Since this separate interference test period occurs when neither a basestation radio nor a subscriber radio is communicating, interference may be more easily detected.

To detect specific interference signatures, such as radar signal signatures, the thresholding circuitry may obtain a bit stream of detected interference. Alternatively, to detect interference of a specific strength, the thresholding circuitry may obtain an indication that the interference exceeds a specific threshold. When the thresholding circuitry obtains a bit stream, the thresholding circuitry of the wireless data radio may identify certain interference, such as radar, by analyzing the signal of the bit stream against certain defined interference signatures. In this way, the wireless data radios of this disclosure may operate in frequency bands governed by specifications that require DFS operation when specific interference (e.g., radar) occurs and/or when interference generally occurs (e.g., ETSI EN 302 502).

Such a wireless data radio system 10, as shown in FIG. 1, may incorporate the dynamic frequency selection operations discussed above. The wireless data radio system 10 may include a base station 12 and at least one subscriber station 14. The base station 12 and the subscriber station 14 may communicate data to one another via communication 16. The base station 12 and the subscriber station 14 may communicate using any suitable protocol, including the 802.16e point-to-multipoint networking standard (e.g., WiMax). In other embodiments, the base station 12 and the subscriber station 14 may communicate using any other suitable protocol. By way of example, the base station 12 and the subscriber station 14 may be models of MDS Mercury radios by General Electric Company.

The base station 12 and the subscriber station 14 may carry out the communication 16 in any suitable frequency band. For instance, base station 12 and the subscriber station 14 may communicate in the 5725 to 5850 MHz frequency band. In certain jurisdictions, operating in this frequency band may be governed by a particular specification. For example, when the base station 12 and the subscriber station 14 communicate in the 5725 to 5850 MHz frequency band, the base station 12 and the subscriber station 14 may comply with the European ETSI EN 302 502 specification. The ETSI EN 302 502 specification requires the use of dynamic frequency selection (DFS) in the presence of radar interference. Indeed, as shown in FIG. 1, a radar station 18 may occasionally operate in the same channel within the frequency band of the base station 12 and the subscriber station 14. The base station 12 and/or the subscriber station 14 may identify when certain radar signatures are interfering with the communication 16. After identifying the signals from the radar tower 18, the base station 12 may perform a dynamic frequency selection (DFS) operation, causing the communication 16 to occur in a newly selected channel.

In another example, the base station 12 and the subscriber station 14 may communicate in a 3.65 GHz-based frequency band (e.g., 3.650-3.700 GHz). To comply with the U.S. FCC Part 90 specification, the base station 12 and/or the subscriber station 14 may initiate a frequency change according to dynamic frequency selection (DFS) operation when inference occurring over a particular threshold intensity occurs. Such interference may derive from a radar tower such as the radar tower 18 or from other sources.

Figure 2:
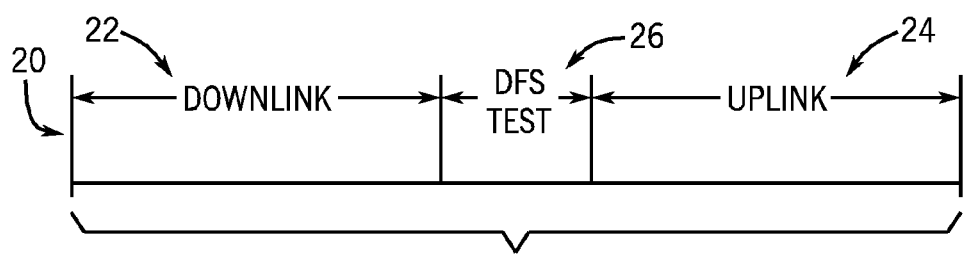
FIG. 2 is a schematic illustration of a communication frame that includes an interference test period, in accordance with an embodiment.

The base station 12 and the subscriber station 14 may detect either type of interference using a communication frame 20, as shown in FIG. 2. The communication frame 20 may include a downlink period 22, an uplink period 24, and an interference-testing period 26. The interference-testing period 26 may enable the base station 12 and/or the subscriber station 14 to test for interference, such as radar pulses from a radar tower 18, at a time when neither the base station 12 nor any of the subscriber stations 14 are communicating. Before any communication frames 20 occur, the base station 12 and/or the subscriber station 14 may perform an initial channel availability check. The channel availability check that occurs before the start of any communication frames 20 may take place for a configurable period of time.

The interference-testing period 26 may occur any suitable time during the communication frame 20. For example, the interference-testing period 26 may take place between the downlink period 22 and the uplink period 24, as shown in FIG. 2. In this configuration, the base station 12 and the subscriber station 14 may detect interference before the subscriber station 14 has begun communicating during the communication frame 20. This may allow the subscriber station 14 to detect interference and provide to the base station 12 a particular packet of information indicating that the subscriber station 14 has detected interference. The base station 12 then may initiate dynamic frequency selection (DFS). Additionally or alternatively, the interference-testing period 26 may take place before both the downlink period 22 and the uplink period 24. This may allow the base station 12 or the subscriber station 14 to identify interference (e.g., radar pulses from the radar tower 18) before the base station 12 and subscriber station 14 even begin communicating during the communication frame 20. Additionally or alternatively, the interference-testing period 26 may take place after both the downlink period 22 and the uplink period 24, allowing the base station 12 and the subscriber station 14 to attempt to communicate before testing for interference.

The downlink period 22, the uplink period 24, and the interference-testing period 26 may have any suitable duration. In one example, the entire communication frame 20 may last about 5 milliseconds and the interference-testing period 26 may last approximately 1 millisecond. The interference-testing period 26 may have any other suitable duration. It is believed, however, that an interference-testing period 26 of 1 millisecond or greater can be used to effectively identify when radar from a radar tower 18 is interfering with the communication 16 between the base station 12 and the subscriber stations 14. As such, in some embodiments, the interference-testing period 26 may have any suitable duration greater than 1 millisecond. In other embodiments, however, the interference-testing period 26 may have a duration less than 1 millisecond.

Figure 3:
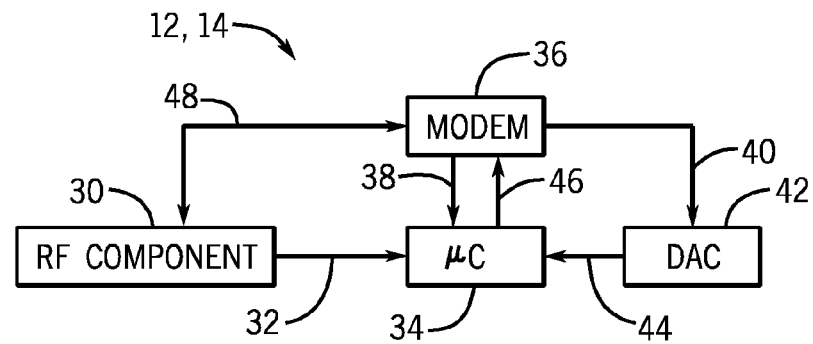
FIG. 3 is a block diagram of components used by wireless radios of the wireless data radio system to detect interference to trigger dynamic frequency selection (DFS), in accordance with an embodiment.

The base station 12 and/or the subscriber station 14 may employ several hardware components to identify radar and/or other interference to initiate dynamic frequency selection (DFS). As seen in FIG. 3, the components of the base station 12 and/or the subscriber station 14 may include, among other things, a radio frequency (RF) component 30 that may provide a received signal strength indicator (RSSI) 32 to thresholding circuitry (e.g., a microcontroller 34). A communications processor (e.g., a modem 36) may provide a control signal 38 to cause the microcontroller 34 to test the RSSI 32 during the interference-testing period 26, when neither the base station 12 nor the subscriber station 14 are communicating. The modem 36 also may provide a digital threshold signal 40 to a digital-to-analog converter (DAC) 42, which may output an analog thresholding signal 44 to the microcontroller 34. The microcontroller 34 may compare the RSSI 32 to the analog thresholding signal 44. The microcontroller 34 may output a digital output signal 46 indicating whether dynamic frequency selection (DFS) is warranted based on this comparison, as will be described in greater detail below. The modem 36 also may provide and/or receive a communication signal 48 during the uplink period 22 and/or the downlink period 24.

The various components of the base station 12 and the subscriber station 14 may derive from a variety of sources. For example, the RF component 30 may represent a radio frequency transceiver and/or receiver and transmitter by maxim integrated of San Jose, California. The modem 36 may be any suitable communications processor to carry out the techniques described in this disclosure. In one example, the modem 36 may be a Sequans SQN1130 WiMAX CPE Modem or a Sequans SQN2130 WiMAX BS Modem by Sequans Communications, S.A. of Paris, France. Finally, the microcontroller 34 may represent any suitable thresholding circuitry and analog-to-digital conversion (ADC) circuitry to carry out the techniques described in this disclosure, including such circuitry available in the PIC18F4553 and PIC18F4550 microcontrollers by Microchip Technology Inc. of Chandler, Arizona. In other embodiments, however, the components shown in FIG. 3 may take any other suitable form (e.g., the microcontroller 34 may be a microprocessor and/or may be integrated into the modem 36). For example, the microcontroller 34 may perform digital-to-analog conversion in the absence of the DAC 42 in certain other embodiments. The microcontroller 34 may, additionally or alternatively, perform interference testing using digital signals rather than analog signals (e.g., comparing a digitized RSSI 32 to the digital threshold signal 40).

The microcontroller 34 and/or the modem 36 thus may include memory and/or storage storing instructions, which may be executed by the microcontroller 34 and/or modem 36, to carry out the interference testing described in this disclosure. The memory and/or storage of the microcontroller 34 and/or modem 36 may represent any suitable article of manufacture, such as random access memory (RAM), read-only memory (ROM), Flash memory, an optical storage medium, or a hard drive, to name a few examples.

Figure 4:
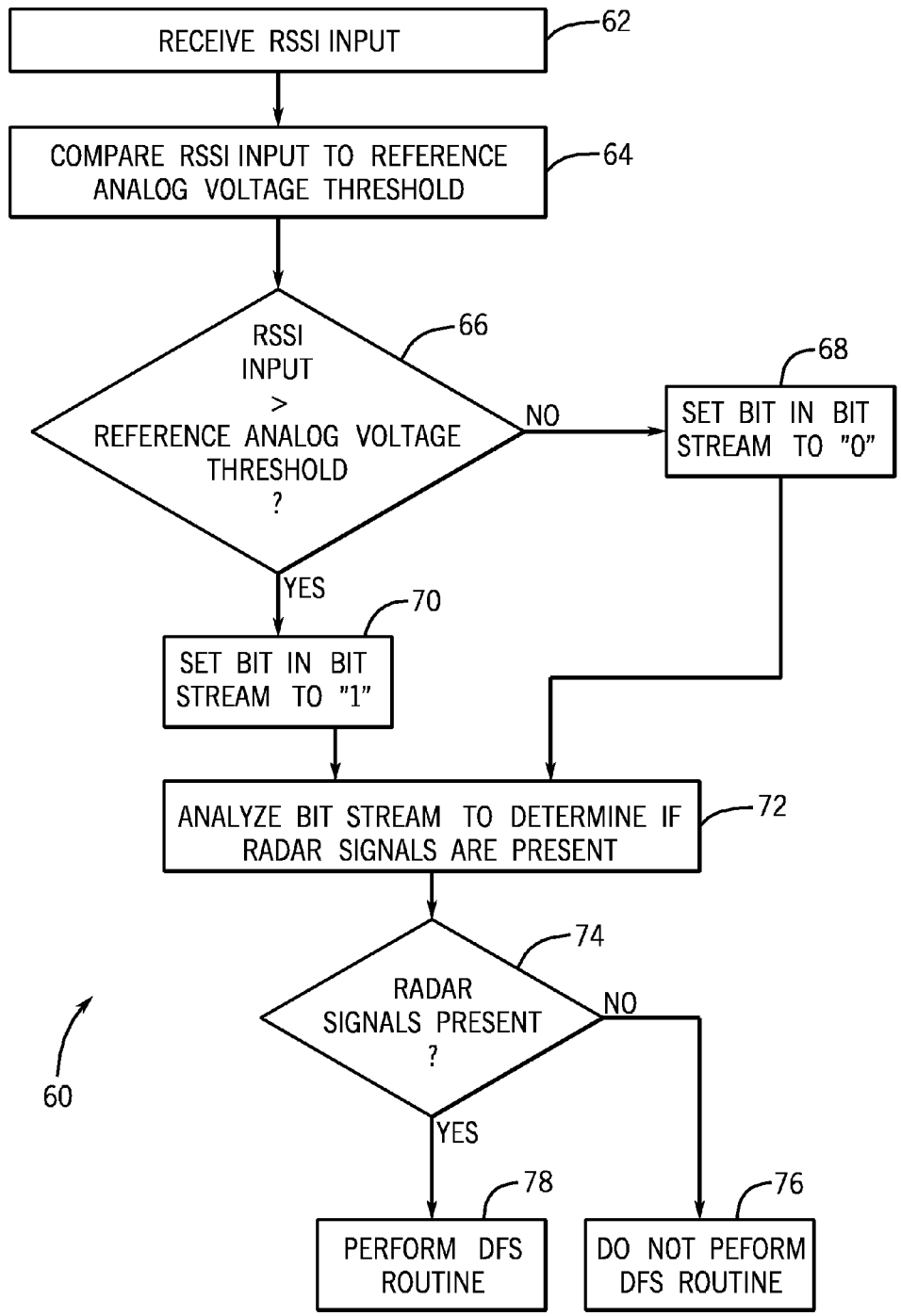
FIG. 4 is a flowchart of a method for detecting interference having a specific signature to initiate dynamic frequency selection (DFS), in accordance with an embodiment.

The base station 12 and/or subscriber stations 14 may identify interference during the interference-testing period 26 in different ways (e.g., depending on the particular specification associated with the frequency band and jurisdiction). For example, the base station 12 and the subscriber stations 14 of the wireless data radio system 10 may operate in the 5725 to 5850 MHz frequency band and may comply with the ETSI EN 302 502 specification. As such, the base station 12 and/or subscriber stations 14 may carry out a method illustrated by a flowchart 60 of FIG. 4. In particular, during the interference-testing period 26 when neither the bases station 12 nor any of the subscriber stations 14 are communicating, the modem 36 may issue a control signal 38 to cause the microcontroller 34 to begin sampling the RSSI 32 from the RF component 30 (block 62). The modem 36 may also provide the digital threshold signal 40 to the DAC 42. The DAC 42 converts the digital threshold 40 into the analog threshold signal 44. The microcontroller 34 may compare the RSSI 32 to this analog threshold signal 44 (block 64). When the RSSI 32 does not exceed the reference analog voltage threshold signal 44 (decision block 66), the microcontroller 34 may determine a "0" in a bit stream (block 68). When the RSSI 32 does exceed the reference analog voltage threshold (decision block 66), the microcontroller 34 may determine a "1" in the bit stream (block 70). These individual bits may be detected at any suitable rate, including 2 bits per microsecond.

The microcontroller 34 further may analyze the bit stream to determine whether radar signals are present in the current frequency channel (block 72). For example, the microcontroller 34 may compare the bit stream of the output signal 46 to any suitable number of defined radar signal signatures. If the bit stream does not match any of the defined radar signal signatures that would indicate radar signals are present (decision block 74), the microcontroller 34 may determine that a dynamic frequency selection (DFS) operation to switch channels is not warranted and may output a "0" as the digital output signal 46 (block 76). Otherwise, if all or part of the bit stream does match a radar signal signature indicating that radar signals are present (decision block 74), the microcontroller 34 may determine that a dynamic frequency selection (DFS) operation to switch frequencies is warranted and may output a "1" as the digital output signal 46 (decision block 78).

In at least one embodiment, the radar signal signatures may be defined as recently detected interference. For instance, pulses in the bit stream (e.g., continuous strings of 1's) may be identified and the pulse lengths stored. In one example, the history of such pulses from the 16 most recent frames 20 may be stored. If two pulses of the same length are found in one frame 20, for example, or if pulses of the same length are found in the history, the microcontroller 34 may identify a radar signal.

Depending on whether the base station 12 or one of the subscriber stations 14 identifies radar signals, a slightly different operation may occur. For example, when the method of the flowchart 60 is carried out by the base station 12, the base station 12 may identify when dynamic frequency selection (DFS) is warranted as well as initiate the DFS frequency routine, because the base station 12 controls the channel over which the base station 12 and the subscriber stations 14 communicate. On the other hand, when a subscriber station 14 identifies the radar signals, the subscriber station 14 may reply to the base station 12 with a particular information packet (e.g., an Ethernet packet) to cause the base station 12 to initiate the dynamic frequency selection (DFS) routine.

Figure 5:
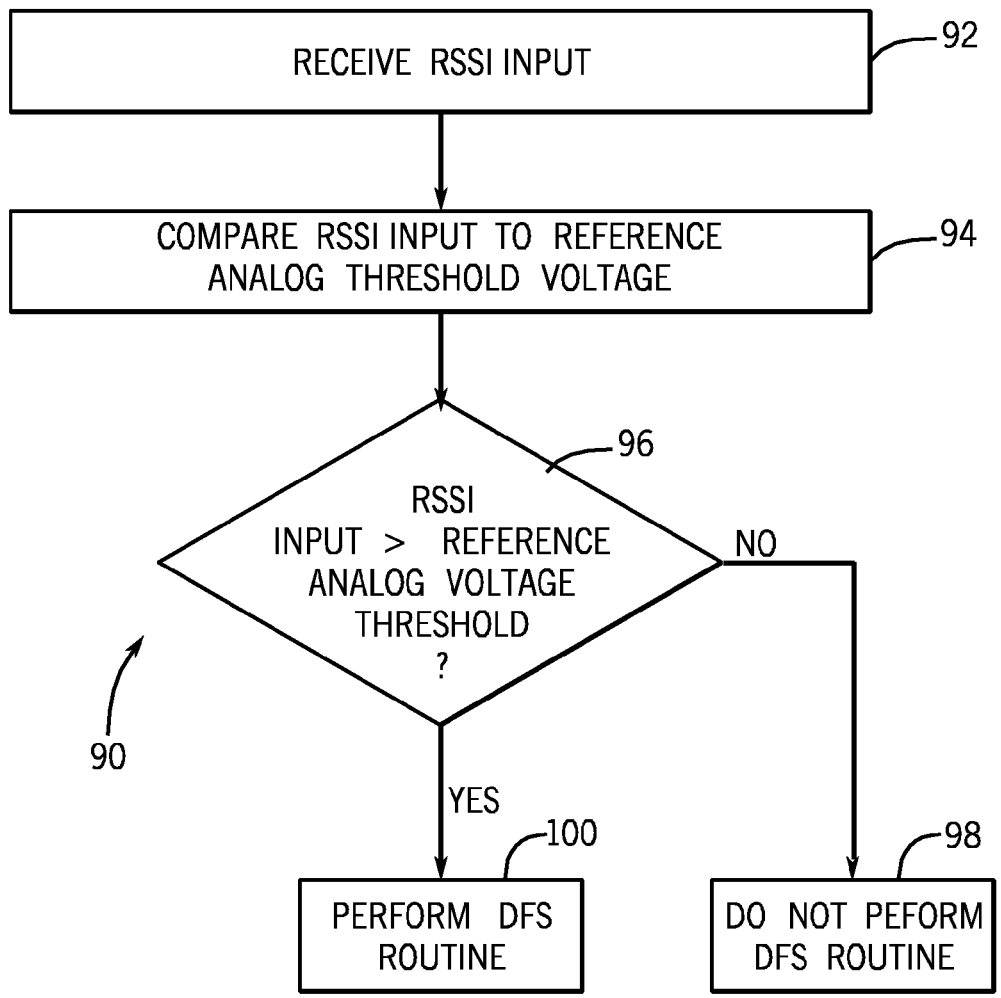
FIG. 5 is a flowchart of a method for detecting interference having a particular power threshold of interference to initiate dynamic frequency selection (DFS), in accordance with an embodiment.

Additionally or alternatively, the base station 12 and/or the subscriber station 14 may identify when interference occurs above a particular threshold. Using this configuration, the base station 12 and/or the subscriber station 14 may comply with the FCC Part 90 specification (e.g., FCC Part 90.1319) when operating in the 3.650 to 3.700 GHz band. For example, the base station 12 and/or the subscriber station 14 may carry out a method shown by a flowchart 90 of FIG. 5. As in the flowchart 60 of FIG. 4, the flowchart 90 of FIG. 5 may begin when, during the interference-testing period 26, the modem 36 may issue a control signal 38 to cause the microcontroller 34 to begin sampling the RSSI 32 from the RF component 30 (block 92). The modem 36 may also provide the digital threshold signal 40 to the DAC 42. The DAC 42 may convert the digital threshold 40 into the analog threshold signal 44. The microcontroller 34 may compare the RSSI 32 to this analog threshold signal 44 (block 94). When the RSSI 32 does not exceed the reference analog voltage threshold signal 44 (decision block 96), the microcontroller 34 may determine that dynamic frequency selection (DFS) is not warranted, and thus may output a "0" in the digital output signal 46 (block 98). When the RSSI 32 does exceed the reference analog voltage threshold (decision block 96), the microcontroller 34 may determine that DFS is warranted, and may output a "1" in the digital output signal 46 (block 100).

Technical effects of the disclosure include, among other things, a wireless data radio system that can comply with dynamic frequency selection specifications under a variety of circumstances. For example, the wireless data radio system may identify radar signals signatures and perform dynamic frequency selection, as required by the specification ETSI EN 302 502 in the 5725 to 5850 MHz frequency band. Additionally or alternatively, the wireless data radio may operate in the 3.650 to 3.700 GHz range and comply with the FCC Part 90 specification (e.g., FCC Part 90.1319), performing dynamic frequency selection (DFS) when interference over a particular threshold is identified.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A wireless radio system comprising:
   a radio frequency receiver configured to provide a received signal strength indicator when the wireless radio system is not communicating; and
   thresholding circuitry configured to:
   determine a time period when the wireless radio system is not communicating;
   instruct said radio frequency receiver to provide a received signal strength indicator at a plurality of point in time during the determined time period;
   generate a bit stream where each bit in the bit stream represents a different point in time of the plurality of points in time;
   for each of the plurality of points in time, compare the received signal strength indicator to a threshold value representative of radio interference at each of the plurality of points in time;
   if a received signal strength indicator exceeds a threshold value, set the corresponding bit to the first value;
   if a received signal strength indicator does not exceed a threshold value, set the corresponding bit to the second value;
   determine whether a dynamic frequency selection operation is warranted based at least in part on the analysis of a plurality of received signal strength indicators in the bit stream; and
   transmit a dynamic frequency selection signal indicating whether the dynamic frequency selection operation is warranted based on the determination.

2. The system of claim 1, wherein the thresholding circuitry is configured to:
   sample the comparison of the received signal strength indicator and the threshold value over time to obtain the bit stream;
   compare the bit stream to at least one radar signal signature; and
   determine that the dynamic frequency selection operation is warranted when at least part of the bit stream matches the at least one radar signal signature.

3. The system of claim 1, wherein the thresholding circuitry is configured to perform the dynamic frequency selection operation when the comparison indicates that the received signal strength indicator exceeds the threshold value.

4. The system of claim 1, wherein the received signal strength indicator and the threshold value comprise analog values.

5. The system of claim 1, comprising a digital-to-analog converter configured to receive a digital threshold value from a communications processor, convert the digital threshold value into an analog threshold value, and provide the analog threshold value to the thresholding circuitry.

6. The system of claim 4, wherein the thresholding circuitry comprises a threshold comparator configured to compare the received signal strength indicator to the threshold value.

7. The system of claim 1, comprising a communications processor configured to perform the dynamic frequency selection operation or to cause another wireless radio system to perform the dynamic frequency selection operation based at least in part on the dynamic frequency selection signal, wherein the communications processor comprises a system-on-a-chip and the thresholding circuitry is external to the communications processor.

8. The system of claim 1, wherein the system is configured to comply with the ETSI EN 302 502 specification.

9. The system of claim 1, wherein the system is configured to comply with the FCC Part 90 specification.

* * * * *